Jan. 24, 1967 — R. W. CASHMAN — 3,299,752
TOOL HOLDER CONSTRUCTION
Filed Sept. 8, 1964 — 2 Sheets-Sheet 1

INVENTOR.
ROBERT W. CASHMAN
BY Learman, Learman & McCulloch
ATTORNEYS

Jan. 24, 1967  R. W. CASHMAN  3,299,752
TOOL HOLDER CONSTRUCTION
Filed Sept. 8, 1964  2 Sheets-Sheet 2
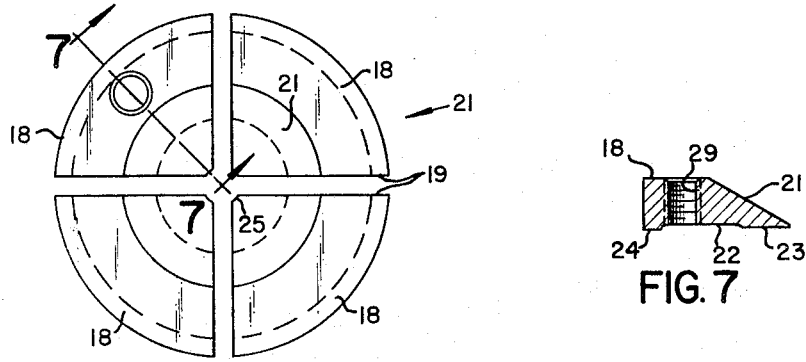
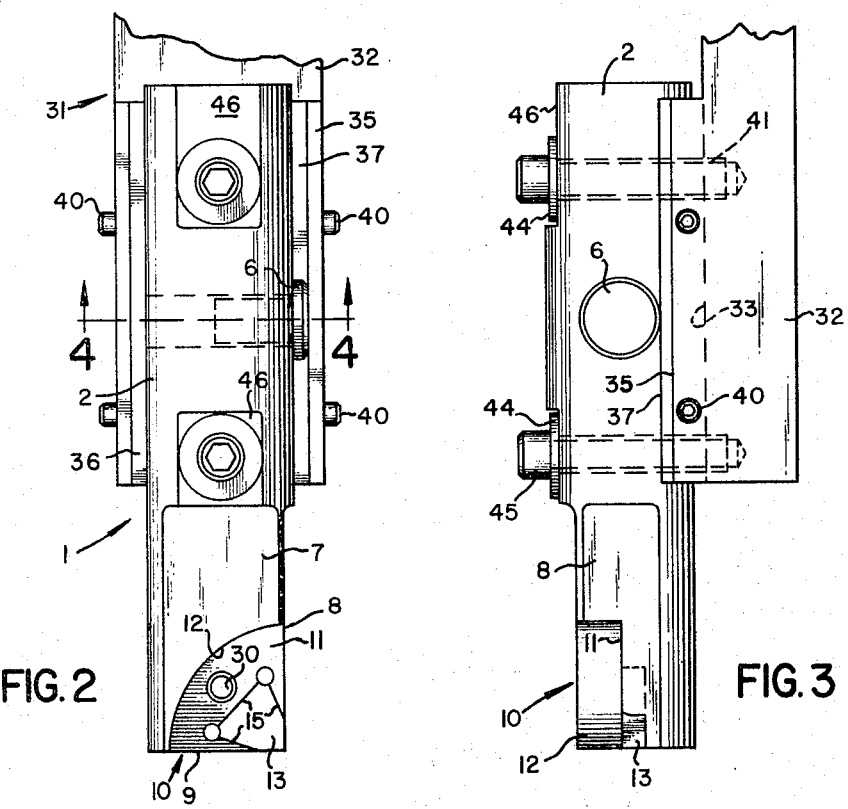
INVENTOR.
ROBERT W. CASHMAN
BY
*Learman, Learman & McCulloch*
ATTORNEYS United States Patent Office 3,299,752
Patented Jan. 24, 1967

3,299,752
TOOL HOLDER CONSTRUCTION
Robert W. Cashman, Saginaw, Mich., assignor to Saginaw Machine & Tool Company, Saginaw, Mich., a corporation of Michigan
Filed Sept. 8, 1964, Ser. No. 394,993
15 Claims. (Cl. 82—36)

This invention relates to tool holders of the kind adapted to accommodate a removable or indexable tool bit, and more particularly to a tool bit holder which is linearly and angularly adjustable so as to enable precise adjustment of a tool bit supported thereby relative to a workpiece.

In the operation of boring, turning, milling and like machines, it frequently is necessary to effect adjustment of the cutting tool relatively to the workpieces being machined in order to compensate for tool wear and other factors. The adjustment of tool holders currently in use on automated, high production machinery frequently is a complex and time consuming procedure. Furthermore, the initial setting of the tools of a machine to perform a machining operation on a particular workpiece frequently consumes an inordinate amount of time. Moreover, it often is necessary to make some slight physical adjustment of the tool holder in order to prevent interference between it and the part to be machined. This frequently results in the operator's utilizing shims and the like or "barbering" the tool holder. In either case, undesirable results can be expected.

An object of this invention is to provide a tool holder which is capable of substantially universal adjustment by exceedingly simple adjusting means.

Another object of the invention is to provide a tool holder which is capable of use in either one of a plurality of angularly adjusted positions.

A further object of the invention is to provide adjusting means for a tool holder of the character described which is of simple and inexpensive construction.

Another object of the invention is to provide a tool holder for indexable tool bits and provided with clamping means of such construction as to be positively anchored in a fixed position by a single anchoring device.

A further object of the invention is to provide adjusting means for a tool holder which is capable of precisely positioning a tool supported by the holder.

Other objects and advantages of the invention will be pointed out specifically or will become apparent from the following description when it is considered in conjunction with the appended claims and the accompanying drawings, wherein:

FIGURE 2 is a top plan view of a tool holder assembled with its base, but with the tool bit and clamp removed;

FIGURE 3 is a side elevational view of the apparatus shown in FIGURE 2;

FIGURE 6 is a top plan view of a number of clamp members constructed according to the invention; and FIGURE 7 is a sectional view taken on the line 7—7 of FIGURE 6.

Figure 4:
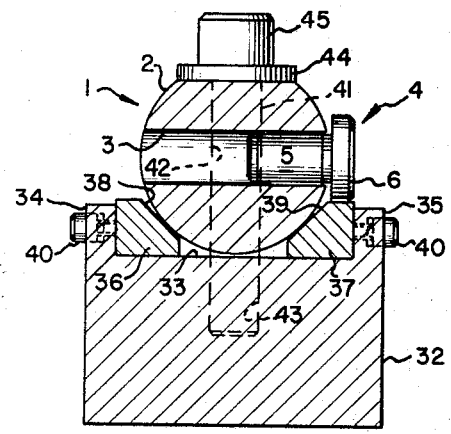
FIGURE 4 is a transverse sectional view taken on the line 4—4 of FIGURE 2.

A tool holder constructed in accordance with the invention comprises an elongated body member 1 having a shank portion 2 which preferably is of generally cylindrical configuration so that its sides and bottom present arcuate surfaces. The body member preferably is provided with a transverse bore 3 intermediate its ends for the removable reception of a stabilizing member 4 having a stem 5 frictionally accommodated in the bore 3 and to one end of which is fixed a head 6. The stabilizing member 4 may be inserted into either end of the bore 3 and, if desired, more than one bore may be provided.

One end of the body member 1 preferably is ground to provide a flat upper surface 7, a flat side wall 8, and a flat end surface 9. The upper surface 7 is provided with a segment-shaped recess 10 having a flat base 11 and an arcuate wall 12 which may be formed on the arc of a circle having its center at the intersection of the surfaces 8 and 9.

The base of the recess 10 is provided with a generally triangular cavity 13 having a rear wall 14 and two side walls 15 which converge along lines that intersect beyond the confines of the body 1 so as to provide an opening 16 through which one point of a well known, substantially flat, triangular tool bit (not shown) may project. Preferably, the cavity 13 is constructed in the manner disclosed in United States Patent No. 3,050,828.

Clamp means designated generally by the reference character 17 is provided for releasably clamping a tool bit in the cavity 13. The clamping means comprises a segment-shaped clamp member 18 having two linear side walls 19 joined at corresponding ends by an arcuate wall 20 the curvature of which corresponds as closely as possible to the curvature of the recess wall 12. The correct curvature of the wall 20 may be assured by forming a disk 21 (see FIGURE 6) on the same radius as the radius of the wall 12 and then cutting the disk into four equal segments 18, thereby simultaneously forming four clamp members 17. Preferably, the radially inner portion of the upper surface of the clamp 18 is inclined downwardly as at 21, and the lower surface of the clamp is provided with an arcuate groove 22 so as to form radially inner and outer presser feet 23 and 24, respectively, that are adapted to bear against the tool bit and the recess base 11 when the clamp is in place. The tip of the clamp 18 may be cut away as at 25, if desired. The opposite sides of the disk 21 preferably are machined to form the incline 21 and the groove 22 prior to the cutting of the disk into the four segments.

Means for releasably anchoring the clamp 18 in place comprises an anchor bolt 26 having two axially spaced threaded portions 27 and 28 that are adapted to be engaged with correspondingly threaded openings 29 and 30 provided in the members 18 and 1, respectively. The opening 29 is located on the radius of the clamp 18, and the opening 30 is located on the radius of the arcuate wall 12. The arrangement is such that rocking of the clamp 18 about the axis of the opening 29 is precluded by the engagement between the arcuate walls 12 and 20, thereby enabling a single anchor bolt to maintain the clamp in angularly fixed relation.

The body member 1 and its associated parts are adapted to be removably supported on a base 31 comprising an elongated bar or block 32 which may be a part of a machine, for example, or, if desired, a separate member which may be bolted or otherwise fixed to the machine. In either event, the member 32 preferably has a flat surface 33 located between two upstanding, substantially parallel rails 34 and 35.

Removably and adjustably supported on the surface 33 is a pair of independent, right-angular, generally triangular in cross-section support members 36 and 37, the member 36 abutting the rail 34 and the member 37 abutting the rail 35. The confronting surfaces of the members 36 and 37 preferably are inclined as at 38 and 39, respectively, along lines that converge toward the base 31 and intersect between the support members. The arrangement is such that the support members 38 and 39 define an upwardly diverging V-shaped support for the body member 1.

It is not necessary that the support members 36 and 37 be of uniform size, nor is it necessary that the inclination of the surfaces 38 and 39 corresponds. However, it is preferred that the height of the members 36 and 37 be greater than the height of the rails 34 and 35. Moreover, the height of the support members should be so related to the diameter of the head 6 of the stabilizing device 4 that the head 6 will engage the upper surface of the associated support member and prevent undesired rotation of the body member 1 in at least one direction beyond the desired amount.

Figure 1:
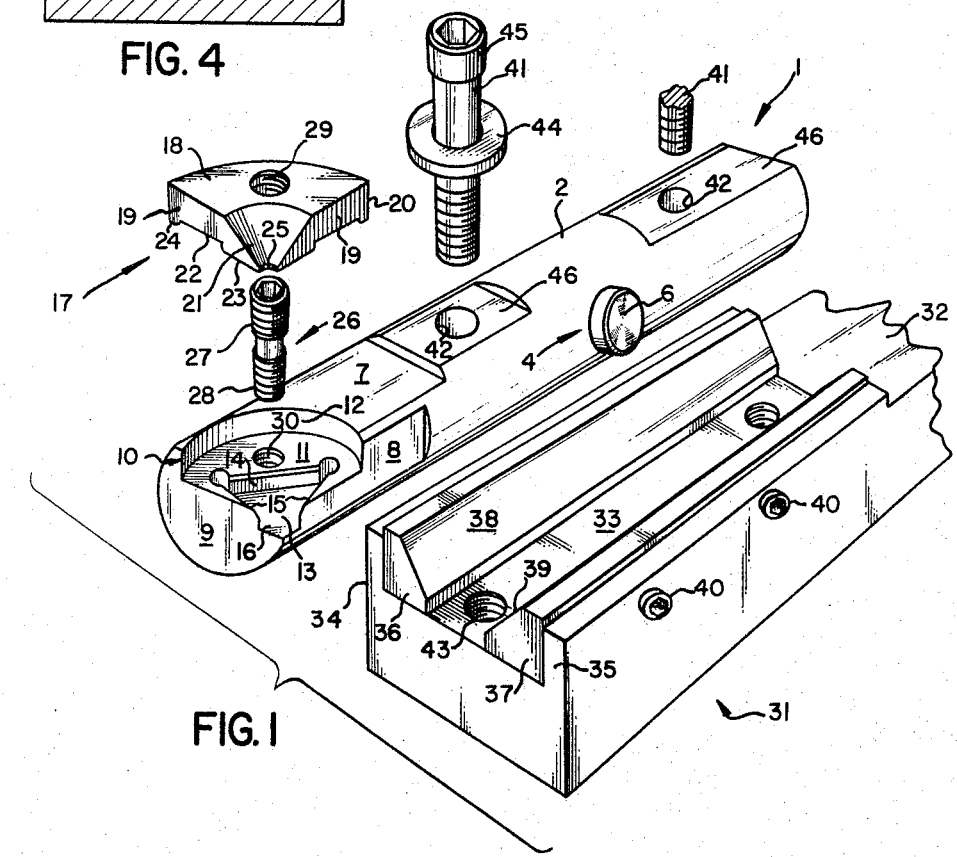
FIGURE 1 is a fragmentary, perspective, exploded view of apparatus constructed in accordance with the invention.

Means is provided for effecting independent adjustment of the support members 36 and 37 relative to the base 31 and to each other. The adjusting means may comprise a plurality of threaded adjusting screws 40 extending through threaded openings formed in the rails 34 and 35 so as to be capable of effecting movement of the members 36 and 37 toward and away from each other. Preferably, the number and location of the adjusting screws 40 is such as to effect adjustment of the members 36 and 37 angularly, so that they either converge or diverge in a direction from left to right, as is viewed in FIGURE 1.

Means is provided for securing the body member 1 and its associated parts between the support members 36 and 37. The securing means may comprise a suitable number of bolts 41 adapted to extend through bores 42 formed in the body 2 and be received in threaded openings 43 formed in the base member 31. The bores 42 should be slightly greater in diameter than the bolts for a purpose to be explained. Suitable washers 44 may be provided to react between the bolt heads 45 and plane surfaces 46 ground on the body member so as to maintain the latter securely against the support members. In these positions of the parts, the sides of the body member will be in line contact with the surfaces 38 and 39 of the respective support members and the head 6 of the stabilizing device will be in engagement with the upper surface of the member 37 so as to provide a rigidly supported tool holder which is incapable of rotation in a clockwise direction, as is viewed in FIGURE 4.

In the initial setting up of the tool holder, the sizes of the support members 36 and 37 and the distance they are spaced apart will be determined by the position in which the tool bit is desired to be located. The plane of the tool bit also will be determined by the association between the head 6 and the support member 37.

Figure 5:
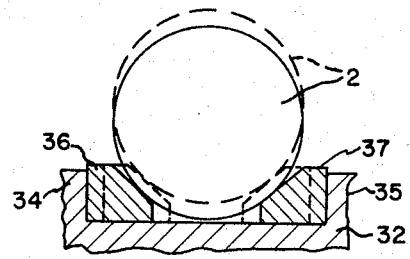
FIGURE 5 is a fragmentary view similar to FIGURE 4, and illustrating the manner in which an adjustment of the tool holder may be made.

When it becomes necessary or desirable to effect adjustment of the tool holder, one or more of the adjusting screws 40 may be manipulated, following loosening of the bolts 41, so as to effect an adjustment of the support members 36 and 37, thereby effecting a bodily adjustment of the body 2. Should both support members 36 and 37 be moved toward one another an equal distance so that they remain parallel, the body member 1 will be adjusted vertically in a direction away from the base 33 of the member 31, as is indicated in dotted lines in FIGURE 5. Should only one of the members 36 or 37 be adjusted toward the other, however, and in such manner that the support members remain parallel, the body member will be adjusted not only vertically but laterally in the direction of movement of the adjusted support member. That is, if the member 37 should be moved toward the member 36, the body member 2 will be adjusted both vertically and to the left from the position shown in FIGURE 4. On the other hand, should one or both of the members 36 and 37 be adjusted so that they converge in a direction from right to left, as viewed in FIGURE 1, the body member 2 will be adjusted so that the end 9 will move upwardly or downwardly away from the base 31. Conversely, adjustment of the members 36 and 37 so that they converge in a direction from left to right, as is viewed in FIGURE 1, will result in adjustment of the body 1 in such manner that the end 9 will move downwardly toward the base.

Any one or all of the adjustments referred to above may be made so as to obtain an extremely precise adjustment of the tool bit relative to a workpiece. Inasmuch as the bores 42 are somewhat larger than the diameter of the bolts 41, it is possible to adjust the body member relatively to the bolts 41. Consequently, the body member is capable of universal adjustment.

Any change in the height of the body member 2 relative to the base 31 will necessitate an adjustment or replacement of the stabilizing device 4. If the head 6 of the stabilizing device has a peripheral edge formed as a cam, it is a simple matter to adjust the position of the head so as to maintain the desired relationship between the plane of the tool bit and the plane of the supporting base. Alternatively, a plurality of different size stabilizing devices may be supplied or, if desired, shims may be interposed between the head 6 and the support member 37.

In some instances it may be desirable to shift the body member 2 laterally relatively to the base 32 without changing its vertical position. This may be accomplished by substituting for the support members 36 and 37 other support members one of which is of greater width than the other and wherein the inclined surfaces are correspondingly different.

The disclosed embodiment is representative of a presently preferred form of the invention, but is intended to be illustrative rather than definitive thereof. The invention is defined in the claims.

I claim:

1. A tool holder comprising a base having a pair of substantially parallel, spaced apart, upstanding rails thereon; a pair of generally triangular in cross-section support members located on said base, one adjacent each of said rails, and so arranged that their confronting sides converge in a direction toward said base along lines that intersect between said members; a body member having a shank portion interposed between and supported on said support members; adjustable anchor means reacting between said base and said body member for releasably securing the latter thereto; and adjustable means reacting between at least one of said rails and the adjacent support member for shifting the latter relatively to the other support member, whereby the position of said body member relative to said base may be adjusted.

2. The construction set forth in claim 1 wherein said one of said support members is elongated and wherein said adjustable means includes an independent, manipulatable part adjacent each end of said one of said support members, whereby said body member may be adjusted linearly and angularly.

3. The construction set forth in claim 1 wherein said shank portion is arcuate where it engages said support members.

4. A tool holder comprising a base; an elongated body member having a longitudinal axis; a pair of independent, relatively movable support members on said base located one on each side of a first plane passing through said axis, each of said support members having a surface in engagement with said body member on one side of a second plane normal to said first plane; means for moving said support members relative to one another and substantially parallel to said second plane; and securing means for maintaining said body member in engagement with said support members in any selected position of adjustment of the latter, the engaged surfaces of said support members and said body member being so related that such relative movement of said support members effects movement of said body member in said first plane.

5. The apparatus set forth in claim 4 wherein the surface of said body in engagement with said support members is arcuate.

6. The apparatus set forth in claim 5 including stabilizing means reacting between said body member and at least one of said support members for limiting relative rotation therebetween in at least one direction.

7. The construction set forth in claim 6 including means on said body member for supporting a tool bit, said bit being adapted to project from one side of said body member, and wherein said stabilizing means is so located with reference to said one side of said body member that rotation of said body member due to engagement between said bit and a workpiece is precluded.

8. The construction set forth in claim 7 wherein said tool bit supporting means includes a cavity in said body member for the reception of said bit, a clamp member overlying said cavity, and means interconnecting said body member and said clamp member for clamping the latter to said body member.

9. The construction set forth in claim 8 wherein said clamp member comprises a plate having a segmental configuration in plan.

10. The construction set forth in claim 9 wherein said body member has a recess formed therein corresponding to the configuration of said clamp member for accommodating the latter therein.

11. The apparatus set forth in claim 4 wherein the surface of each support member in engagement with said body member is inclined.

12. The apparatus set forth in claim 11 wherein the inclination of said inclined surfaces is such that they converge along lines that intersect between said support members.

13. A tool holder comprising a base; an elongated body member having a longitudinal axis and a generally cylindrical shank; a first support member generally triangular in cross-section having an inclined supporting surface; a second support member generally triangular in cross-section independent of said first support member having an inclined supporting surface, said support members being located on said base on opposite sides of a first plane passing through said longitudinal axis and through said base and with the inclined surfaces of said supporting members in engagement with said shank on the same side of a second plane passing through the longitudinal axis of said shank and normal to said first plane; and securing means acting between said base and said body member for maintaining said shank in engagement with said supporting surfaces.

14. The construction set forth in claim 13 including means for effecting relative movement of said support members substantially parallel to said second plane.

15. The construction set forth in claim 13 wherein the inclination of the supporting surfaces of the respective support members is such that said supporting surfaces converge toward said base along lines that intersect between said support members.

References Cited by the Examiner

UNITED STATES PATENTS

| | | | |
|---|---|---|---|
| 908,804 | 1/1909 | Rhoades | 82—37 |
| 1,323,092 | 11/1919 | Palmer | 82—36 X |
| 2,482,041 | 9/1949 | Tiefenbacher | 82—36 |
| 2,594,532 | 4/1952 | Amstutz | 82—37 |
| 2,833,026 | 5/1958 | Kostka | 82—36 X |
| 3,050,828 | 8/1962 | Cashman et al. | 29—96 |
| 3,142,215 | 7/1964 | Mancuso | 82—36 |

ANDREW R. JUHASZ, *Primary Examiner.*

LEONIDAS VLACHOS, *Examiner.*